United States Patent
Miyagi

(10) Patent No.: US 7,133,653 B2
(45) Date of Patent: Nov. 7, 2006

(54) RECEIVER AND COMPOSITE COMPONENT HAVING LOCAL OSCILLATOR COMPONENTS AND MIXING CIRCUIT INTEGRALLY FORMED ON SEMICONDUCTOR SUBSTRATE

(75) Inventor: Hiroshi Miyagi, Jouetsu (JP)

(73) Assignee: Niigata Seimitsu Co., Ltd., Niigata (JP)

( * ) Notice: Subject to any disclaimer, the term of this patent is extended or adjusted under 35 U.S.C. 154(b) by 205 days.

(21) Appl. No.: 10/481,917

(22) PCT Filed: Jun. 24, 2002

(86) PCT No.: PCT/JP02/06270

§ 371 (c)(1),
(2), (4) Date: Dec. 23, 2003

(87) PCT Pub. No.: WO03/001691

PCT Pub. Date: Jan. 3, 2003

(65) Prior Publication Data

US 2004/0152430 A1   Aug. 5, 2004

(30) Foreign Application Priority Data

Jul. 25, 2000   (JP) ............... 2001-224895
Jun. 25, 2001   (JP) ............... 2001-190874

(51) Int. Cl.
*H04B 1/16*   (2006.01)
*H04B 1/10*   (2006.01)
*H04B 1/06*   (2006.01)
*H04B 7/00*   (2006.01)

(52) U.S. Cl. ............ 455/130; 455/147; 455/148; 455/217; 455/222; 455/255; 455/257; 455/296

(58) Field of Classification Search ............... 455/130, 455/147–148, 217, 222, 255–260, 296
See application file for complete search history.

(56) References Cited

U.S. PATENT DOCUMENTS 6,760,579 B1 * 7/2004 Yokoyama et al. ......... 455/352
2001/0031629 A1 * 10/2001 Elder et al. ................. 455/324
2002/0142746 A1 * 10/2002 Li et al. ..................... 455/307

FOREIGN PATENT DOCUMENTS

| JP | 06-291556 | 10/1994 |
| JP | 07-245568 | 9/1995 |
| JP | 2000-82779 | 3/2000 |
| JP | 2000-332629 | 11/2000 |
| JP | 2002-057294 | 2/2002 |

* cited by examiner

Primary Examiner—George Eng
Assistant Examiner—Michael Thier
(74) Attorney, Agent, or Firm—patenttm.us; James H. Walters

(57) ABSTRACT

A receiver and a composite component for preventing noise produced by sneaking of a local oscillation signal. An FM receiver comprises a high-frequency amplifier circuit 11, a mixing circuit 12, a local oscillator 13, intermediate-frequency filters 14 and 16, an intermediate-frequency amplifier circuit 15, a limit circuit 17, an FM detection circuit 18, and a stereo demodulation circuit 19. The mixing circuit 12 and the local oscillator 13 constitute a one-chip composite component 30 integrally formed on a semiconductor substrate. The frequency of the local oscillation signal is set so that the difference of frequency between the local oscillation signal and a modulated wave signal may be smaller than the occupied bandwidth of the modulated wave signal.

7 Claims, 4 Drawing Sheets

… (1)

RECEIVER AND COMPOSITE COMPONENT HAVING LOCAL OSCILLATOR COMPONENTS AND MIXING CIRCUIT INTEGRALLY FORMED ON SEMICONDUCTOR SUBSTRATE

TECHNICAL FIELD

The present invention relates to a receiver and a composite component for providing frequency conversion of a received modulated wave signal.

BACKGROUND ART

A general receiver adopting a super-heterodyne method converts a frequency by using a mixing circuit after amplifying a modulated wave signal received via an antenna at a high frequency, and demodulates it after converting it into an intermediate-frequency signal having a predetermined frequency. For instance, an FM receiver in Japan is using a local oscillation signal deviated from a carrier frequency of the modulated wave signal by 10.7 MHz, where FM detection and stereo demodulation processes are performed to the intermediate-frequency signal of 10.7 MHz.

In particular, in some data communication fields, a technique called a direct conversion method using the local oscillation signal almost equal to the modulated wave signal, and such a receiver demodulates the intermediate-frequency signal of a low frequency.

Incidentally, the above-mentioned receiver in the past has a problem that, if a signal leaked via printed wiring of a local oscillator for generating the local oscillation signal sneaks on an input side of the modulated wave signal, it becomes noise and appears in the intermediate-frequency signal. In particular, in the case of the receiver adopting the direct conversion method, the frequencies of the modulated wave signal and local oscillation signal are close, and so the same frequency component as the local oscillation signal is superimposed as noise on the modulated wave signal. Furthermore, in the case where this noise component is included in a frequency bandwidth of the modulated wave signal, the noise component cannot be eliminated from the intermediate-frequency signal so that quality of a receiver signal deteriorates.

DISCLOSURE OF THE INVENTION

The present invention was created in view of these points, and an object thereof is to provide a receiver and a composite component capable of preventing occurrence of noise due to sneaking of a local oscillation signal.

To solve the above-mentioned problem, the receiver according to the present invention has a high-frequency amplifier circuit for amplifying a modulated wave signal received via an antenna, a local oscillator for generating a predetermined local oscillation signal, and a mixing circuit for mixing and outputting the modulated wave signal amplified by the high-frequency amplifier circuit and the local oscillation signal outputted from the local oscillator, where all the local oscillator components and the mixing circuit are integrally formed on a semiconductor substrate. In order to convert a frequency of the modulated wave signal, a composite component of the present invention comprises the local oscillator for generating the predetermined local oscillation signal and the mixing circuit for mixing and outputting the modulated wave signal and the local oscillation signal outputted from the local oscillator, where all the local oscillator components and the mixing circuit are integrally formed on the semiconductor substrate.

It is possible, by integrating all the components of the local oscillator and forming them on one chip on the semiconductor substrate having the mixing circuit formed thereon, to reduce noise sneaking on the antenna side from a connection line connecting the local oscillator to the mixing circuit in the case where they are separate components and the noise sneaking on the antenna side from the connection line in the case where only a part of the local oscillator (a coil for instance) is externally mounted.

In the case where it further comprises a phase-locked loop circuit constituting a frequency synthesizer together with the local oscillator, it is desirable to integrally form the phase-locked loop circuit on the above-mentioned semiconductor substrate. It is thereby possible to securely prevent the local oscillation signal inputted to the phase-locked loop circuit from the local oscillator and a harmonic component thereof from sneaking on the input side of the high-frequency amplifier circuit or the mixing circuit.

It is also desirable that a difference between the frequency of the above-mentioned local oscillation signal and a carrier frequency of the modulated wave signal is smaller than an occupied frequency bandwidth of the modulated wave signal. Especially, in the case where the frequencies of such modulated wave signal and local oscillation signal are set respectively, it is possible to prevent deterioration of communication quality arising when the local oscillation signal sneaks on the modulated wave signal side.

It is also desirable to form at least the mixing circuit and the local oscillator into one chip by using a CMOS process or a MOS process. It is possible, by using the CMOS process or the MOS process, to reduce the component cost and product cost of the entire receiver.

It is also desirable that a power supply circuit for supplying an operating voltage to the local oscillator and mixing circuit respectively is provided to the outside of the above-mentioned semiconductor substrate, and a filter for eliminating the local oscillation signal and harmonic component thereof is inserted into a power supply line and a ground line connected to the power supply circuit inside the semiconductor substrate. Thus, it is possible to prevent the local oscillation signal and harmonic component thereof from sneaking on the input side of the high-frequency amplifier circuit or the mixing circuit by way of the power supply circuit.

BEST MODE FOR CARRYING OUT THE INVENTION

Hereafter, an FM receiver according to an embodiment of the present invention will be described in detail.

Figure 1:
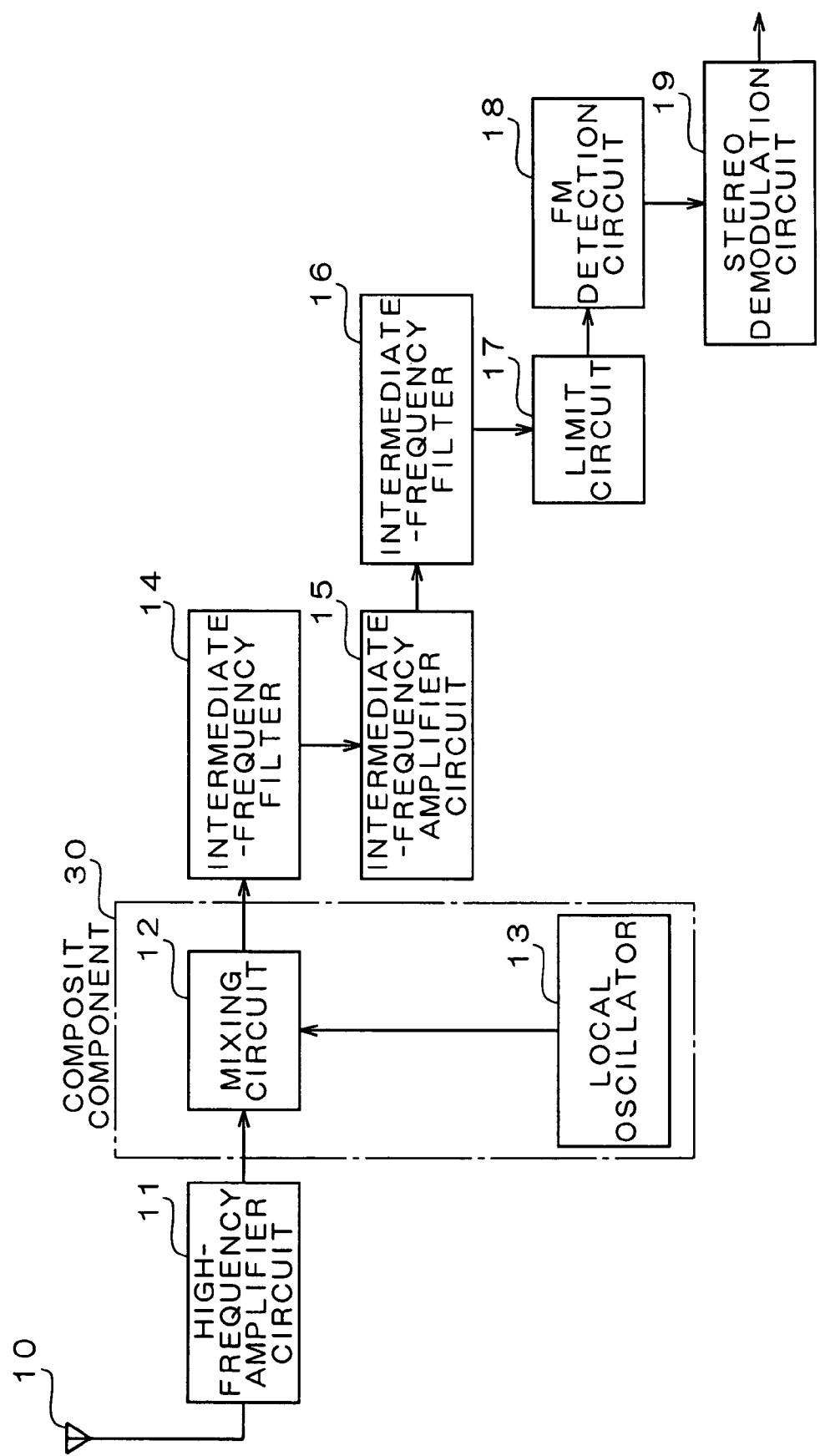
FIG. 1 is a diagram showing a configuration of the FM receiver according to the embodiment.

FIG. 1 is a diagram showing a configuration of the FM receiver according to the embodiment. As shown in FIG. 1, the FM receiver according to the embodiment is comprised of a high-frequency amplifier circuit 11, a mixing circuit 12, a local oscillator 13, intermediate-frequency filters 14, 16, an intermediate-frequency amplifier circuit 15, a limiting circuit 17, an FM detection circuit 18 and a stereo demodulator circuit 19. After amplifying an FM modulated wave signal received by an antenna 10 with the high-frequency amplifier circuit 11, a high-frequency signal is converted into an intermediate-frequency signal by mixing it with a local oscillation signal outputted from the local oscillator 13.

For instance, if a frequency of the amplified FM modulated wave signal outputted from the high-frequency amplifier circuit 11 is f1 and the frequency of the local oscillation signal outputted from the local oscillator 13 is f2, a signal having the frequency of f1±f2 is outputted from the mixing circuit 12. According to this embodiment, the frequencies f1 and f2 of the two signals are set at approximately equal values. To be more specific, the value of the frequency f2 of the local oscillation signal is set so that the difference between f1 and f2 becomes smaller than an occupied frequency bandwidth of the FM modulated wave signal.

The intermediate-frequency filters 14 and 16 are provided to a preceding stage and a subsequent stage to the intermediate-frequency amplifier circuit 15, and extract frequency components included in the occupied frequency bandwidth of the modulated wave signal from an inputted intermediate-frequency signal. The intermediate-frequency amplifier circuit 15 amplifies the intermediate-frequency signal.

The limiting circuit 17 amplifies the inputted intermediate-frequency signal with a high gain. The limiting circuit 17 is constituted by cascade-connecting a plurality of stages of transistors, and amplifies an input signal with the gain of 90 dB or so as a whole. The FM detection circuit 18 performs FM detection to an FM signal of fixed amplitude outputted from the limiting circuit 17. The stereo demodulator circuit 19 performs stereo demodulation to a composite signal after the FM detection so as to generate an L signal and an R signal.

The FM receiver having the above-mentioned configuration has the mixing circuit 12 and the local oscillator 13 constituted as a composite component 30 of one chip formed on the same substrate. In particular, the entire components of the local oscillator 13 are formed on this substrate according to this embodiment.

Figure 2:
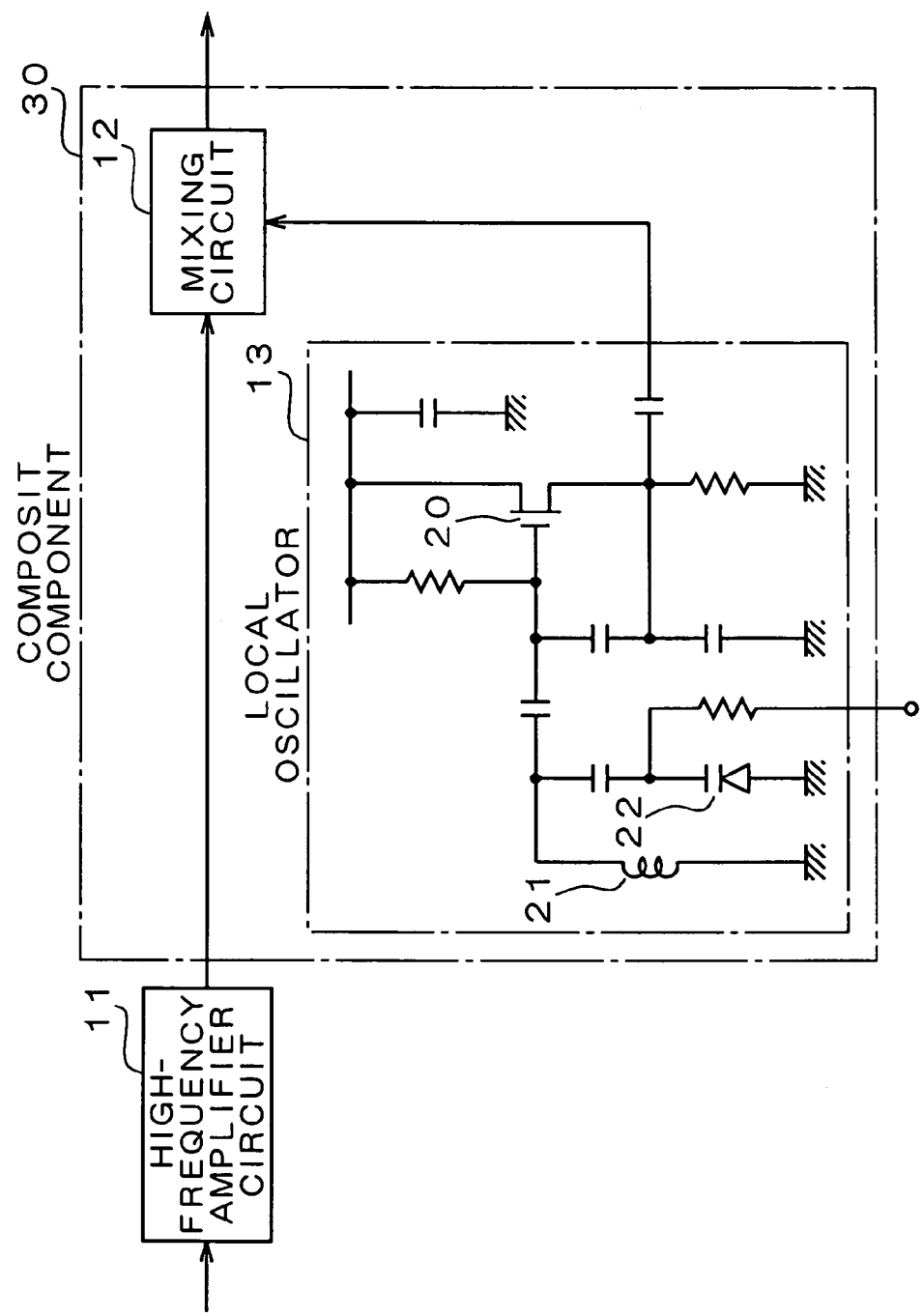
FIG. 2 is a circuit diagram showing a concrete configuration of the local oscillator.

FIG. 2 is a circuit diagram showing a concrete configuration of the local oscillator 13, showing the case where the local oscillator 13 is implemented by a clapp oscillator as an example. The local oscillator 13 shown in FIG. 2 includes an n-channel MOS-type FET 20, a coil 21 constituting a resonant circuit, and a variable capacitance diode 22 connected in parallel to the coil 21. In the past, at least the coil 21 was provided as a separate component and was externally mounted. According to this embodiment, however, all the components of the local oscillator 13 including the coil 21 and variable capacitance diode 22 are integrally formed on a semiconductor substrate by using a predetermined semiconductor process, where the local oscillator 13 and mixing circuit 12 are a one-chip component.

In the configuration shown in FIG. 2, the MOS-type FET 20 is used so that the entirety of the local oscillator 13 and mixing circuit 12 is formed by a CMOS process or a MOS process. In this case, the coil 21 can be implemented, for instance, by vorticosely forming a metal film or if an oscillation frequency is high, by forming the metal film of less than one round on the semiconductor substrate. The variable capacitance diode 22 can be implemented, for instance, by using an FET of which applied capacitance is variable according to a gate voltage.

Thus, the FM receiver according to the embodiment has the mixing circuit 12 for converting the frequency for a received modulated wave signal and all the components of the local oscillator 13 constituted as the composite component 30 of one chip. To be more specific, all the components of the local oscillator 13 are integrated on the semiconductor substrate having the mixing circuit 12 formed thereon so as to form the components on one chip. And it is there by possible to reduce the noise sneaking on the antenna 10 side from a connection line connecting the local oscillator 13 to the mixing circuit 12 in the case where they are separate components and the noise sneaking on the antenna side from the connection line in the case where only a part of the local oscillator 13 (a coil for instance) is externally mounted.

Even in the case where the difference between the frequency of the local oscillation signal and a carrier frequency of the modulated wave signal is smaller than the occupied frequency bandwidth of the modulated wave signal, it is possible to prevent the same frequency component as the local oscillation signal from being superimposed as noise on the modulated wave signal so as to prevent deterioration of communication quality due to such a noise component which is inseparable in a post-process.

It is also possible, by forming the composite component 30 by the CMOS processor the MOS process, to reduce the component cost and product cost of the entire receiver by a simplified manufacturing process.

The present invention is not limited to the above embodiment, but various modified embodiments are possible within the range of the gist thereof. For instance, the case of forming the composite component 30 by the CMOS process or the MOS process was considered in the above-mentioned embodiment. However, it may also be formed by another semiconductor process such as a bipolar process, for instance. In this case, it maybe implemented by using a bipolar transistor instead of the FET 20, and the variable capacitance diode 22 may also be implemented by using a p-n junction.

According to the above-mentioned embodiment, the composite component 30 including the mixing circuit 12 and the local oscillator 13 was considered. It is also feasible, however, to render it as one chip including the preceding or subsequent circuits. For instance, it is also feasible to form the entirety of the high-frequency amplifier circuit 11, mixing circuit 12, local oscillator 13, intermediate-frequency filters 14, 16, intermediate-frequency amplifier circuit 15, limiting circuit 17, FM detection circuit 18 and stereo demodulator circuit 19 shown in FIG. 1 on the same semiconductor substrate so as to implement the main circuits of the receiver on one chip.

In particular, it is desirable, for the sake of further effectively preventing the local oscillation signal outputted by the local oscillator 13 from sneaking on the antenna 10 side, to use the composite component rendered as one chip including a PLL (phase-locked loop) circuit constituting a frequency synthesizer together with the local oscillator 13.

Figure 3:
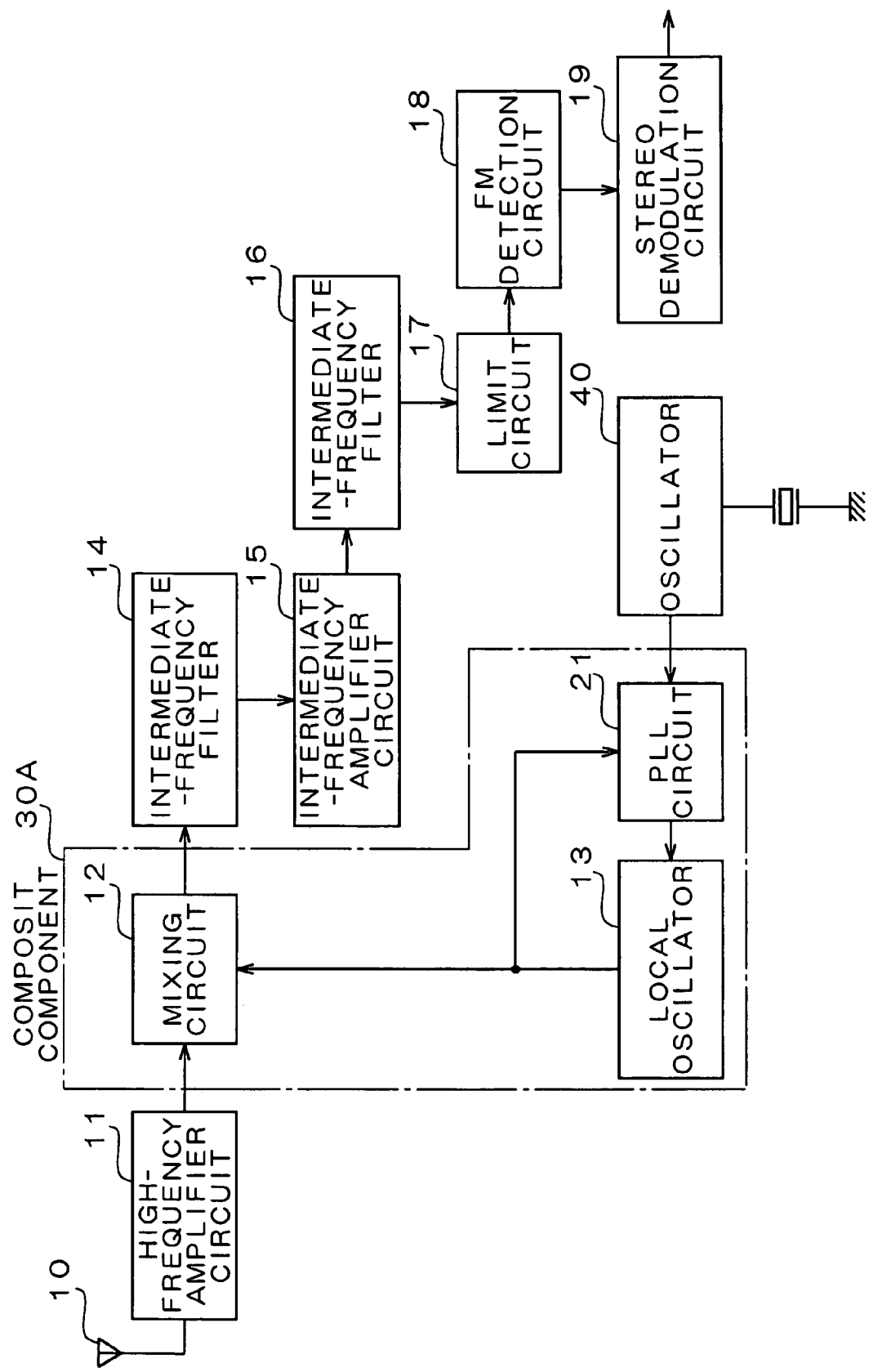
FIG. 3 is a circuit diagram showing the configuration of the FM receiver using the composite component including the PLL circuit.

FIG. 3 is a circuit diagram showing the configuration of the FM receiver using the composite component including the PLL circuit. A composite component 30A shown in FIG. 3 has the configuration in which a PLL circuit 21 is added to the composite component 30 shown in FIG. 1. The PLL circuit 21 constitutes the frequency synthesizer together with the local oscillator 13, and uses the signal outputted from an oscillator 40 as a reference signal so as to exert control to cause the local oscillator 13 to oscillate at the frequency N times higher than that of this reference signal. The value N can be arbitrarily changed by a control section (not shown) so that the oscillation frequency of the local oscillator 13 is switched by switching the value N. Furthermore, it is possible, by using the composite component 30A rendered as one chip including the PLL circuit 21 constituting the frequency synthesizer together with the local oscillator 13, to securely prevent the local oscillation signal inputted to the PLL circuit 21 from the local oscillator 13 and the harmonic component thereof from sneaking on the input side of the high-frequency amplifier circuit 11 or the mixing circuit 12.

This embodiment described the FM receiver. However, the present invention is also applicable to various receivers such as an AM receiver and a data terminal device, transmitters or communication devices in the case of including the mixing circuit and local oscillator therein. The present invention is also applicable, for the sake of performing orthogonal demodulation, to the receiver and so on having two mixing circuits, one local oscillator and one phase shifter. In this case, all the components of the mixing circuits, local oscillator and phase shifter should be formed on the semiconductor substrate.

The above embodiment does not especially describe a connection state between the composite components 30, 30A and the power supply circuit. In the case where the power supply circuit for supplying an operating voltage to each section of the receiver is provided outside the composite components 30 and 30A, however, it is desirable to insert a filter into a power supply line and a ground line which are inside the composite components 30 and 30A and connected to the power supply circuit.

Figure 4:
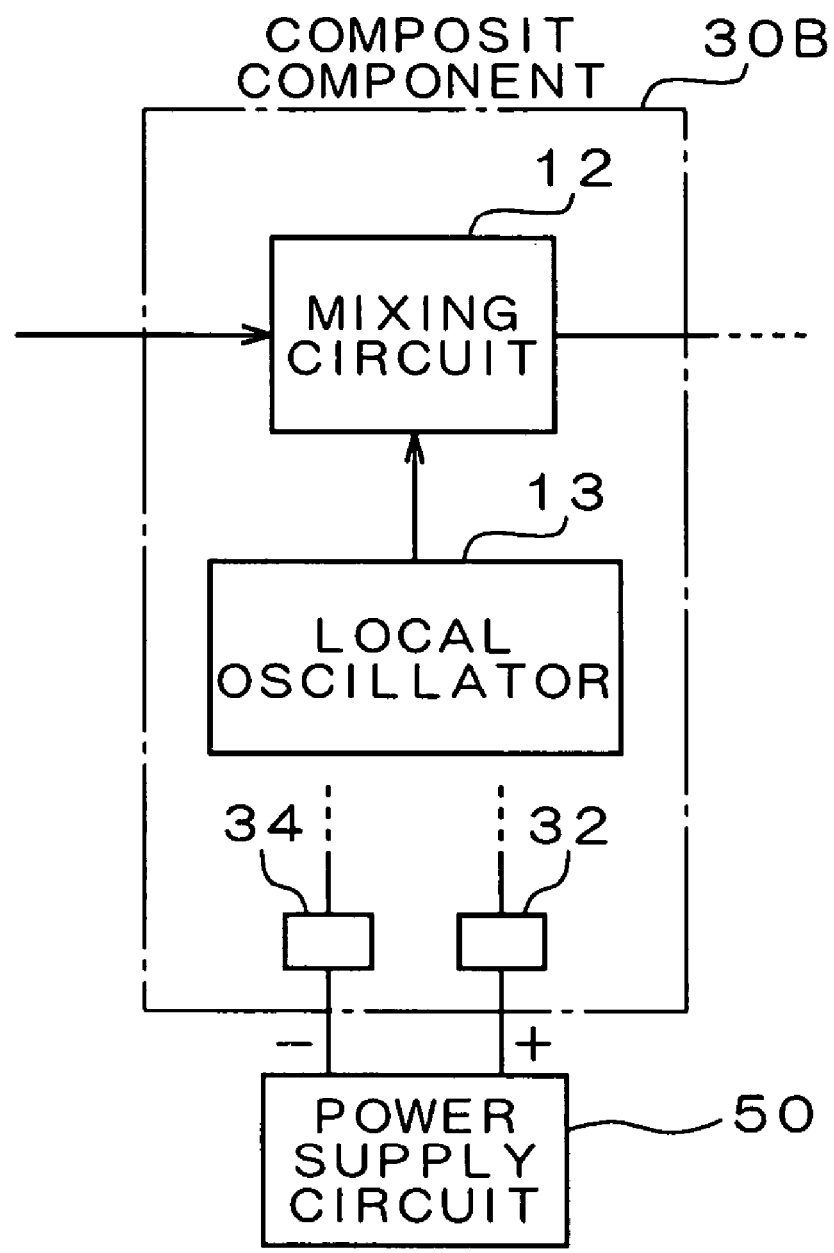
FIG. 4 is a diagram showing a modified example of the composite component in the case of having the power supply circuit connected outside.

FIG. 4 is a diagram showing a modified example of the composite component in the case of having the power supply circuit connected outside. A composite component 30B shown in FIG. 4 includes filters 32 and 34 inserted into the power supply line and ground line used for supplying the operating voltage to each of the local oscillator 13 and mixing circuit 12 from a power supply circuit 50 outside other than the mixing circuit 12 and local oscillator 13. The composite component 30B is used instead of the composite components 30 included in the receiver shown in FIG. 1, and the power supply circuit 50 also supplies the operating voltage to other circuits such as the high-frequency amplifier circuit 11 and intermediate-frequency amplifier circuit 15. FIG. 4 shows the composite component 30B in which the filters 32 and 34 are added to the composite component 30 shown in FIG. 1. It is also feasible, however, to add these filters to the composite component 30A shown in FIG. 3.

The filters 32 and 34 eliminate the local oscillation signal and harmonic component thereof to be superimposed on the power supply line or the ground line from the local oscillator 13 and mixing circuit 12. It is possible, by using the filters 32 and 34, to prevent the local oscillation signal and harmonic component thereof from sneaking on the input side of the high-frequency amplifier circuit 11 or the mixing circuit 12 by way of the power supply circuit 50.

INDUSTRIAL APPLICABILITY

As described above, according to the present invention, it is possible, by integrating all the components of the local oscillator and forming them on one chip on the semiconductor substrate having the mixing circuit formed thereon, to reduce the noise sneaking on the antenna side from the connection line connecting the local oscillator to the mixing circuit in the case where they are separate components and the noise sneaking on the antenna side from the connection line in the case where only a part of the local oscillator is externally mounted.

The invention claimed is:

1. A receiver having a high-frequency amplifier circuit for amplifying a modulated wave signal received via an antenna, a local oscillator for generating a predetermined local oscillation signal, and a mixing circuit for mixing and outputting the modulated wave signal amplified by said high-frequency amplifier circuit and the local oscillation signal outputted from said local oscillator, characterized in that all said local oscillator components and said mixing circuit are integrally formed on a semiconductor substrate, and characterized in that a power supply circuit for supplying an operating voltage to said local oscillator and said mixing circuit respectively is provided to the outside of said semiconductor substrate, and a filter for eliminating said local oscillation signal and a harmonic component thereof is inserted into a power supply line and a ground line connected to said power supply circuit inside said semiconductor substrate.

2. The receiver according to claim 1, characterized in that it further comprises a phase-locked loop circuit constituting a frequency synthesizer together with said local oscillator, and said phase-locked loop circuit is integrally formed on said semiconductor substrate.

3. The receiver according to claim 1, characterized in that a difference between a frequency of said local oscillation signal and a carrier frequency of said modulated wave signal is smaller than an occupied frequency bandwidth of said modulated wave signal.

4. The receiver according to claim 1, characterized in that at least said mixing circuit and said local oscillator are formed into one chip by using a CMOS process or a MOS process.

5. A composite component for providing frequency conversion of a modulated wave signal, characterized in that it comprises a local oscillator for generating a predetermined local oscillation signal and a mixing circuit for mixing and outputting said modulated wave signal and the local oscillation signal outputted from said local oscillator, and all said local oscillator components and said mixing circuit are integrally formed on a semiconductor substrate, and characterized in that a power supply circuit for supplying an operating voltage to said local oscillator and said mixing circuit respectively is provided to the outside of said semiconductor substrate, and a filter for eliminating said local oscillation signal and a harmonic component thereof is inserted into a power supply line and a ground line connected to said power supply circuit inside said semiconductor substrate, and characterized in that a difference between a frequency of said local oscillation signal and a carrier frequency of said modulated wave signal is smaller than an occupied frequency bandwidth of said modulated wave signal.

6. The composite component according to claim 5, characterized in that it further comprises a phase-locked loop circuit constituting a frequency synthesizer together with said local oscillator, and said phase-locked loop circuit is integrally formed on said semiconductor substrate.

7. The composite component according to claim 5, characterized in that at least said mixing circuit and said local oscillator are formed into one chip by using a CMOS process or a MOS process.

* * * * *